US008665378B2

(12) United States Patent
Hsu et al.

(10) Patent No.: US 8,665,378 B2
(45) Date of Patent: Mar. 4, 2014

(54) FILTER FOR VIDEO STREAM

(75) Inventors: Han-Jen Hsu, Zhubei (TW); Wei-Kuo Lee, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 231 days.

(21) Appl. No.: 13/241,721

(22) Filed: Sep. 23, 2011

(65) Prior Publication Data
US 2012/0257113 A1  Oct. 11, 2012

(30) Foreign Application Priority Data

Apr. 11, 2011  (TW) .............................. 100112489 A (51) Int. Cl.
*H04N 5/21* (2006.01)

(52) U.S. Cl.
USPC ........... 348/701; 348/607; 348/606; 348/620; 348/672; 348/700; 382/275

(58) Field of Classification Search
USPC ................. 348/607, 606, 620, 672, 700, 701; 382/260, 275; 375/240.27, 240.29
See application file for complete search history.

(56) References Cited

U.S. PATENT DOCUMENTS 7,860,167 B2 * 12/2010 Le Dinh et al. ............ 375/240.2

* cited by examiner

*Primary Examiner* — Jefferey Harold
*Assistant Examiner* — Jean W Desir
(74) *Attorney, Agent, or Firm* — Edell, Shapiro & Finnan, LLC (57) ABSTRACT

A filter for a video stream is provided. The filter generates a filtered picture according to a current picture and its previous picture. A motion difference calculator accumulates differences between current picture values and previous picture values within a neighborhood of each pixel to provide a corresponding motion difference. A histogram counter performs histogram counting according to motion differences of the pixels. A filter value calculator provides a filter value for each pixel according to operations of the motion difference calculator and the histogram counter. A blender blends the current picture value and the previous picture value of each pixel according to weightings correlated to the filter value, and provides a filtered picture value for each pixel of the filtered picture.

13 Claims, 10 Drawing Sheets

$$I\_f(x,y) = a(x,y) * I'(x,y) + (1 - a(x,y)) * I(x,y) \quad -(E0)$$

$$md\_sum(x,y) = \sum_{i=-N1}^{N1} |I(x+i,y) - I'(x+i,y)| \quad -(E1)$$

$$picture\_histogram\_set = \{ md\_sum(x,y) : (md\_sum(x,y) < TH0) \} \quad -(E2)$$

$$noise\_histogram\_set = \{ md\_sum(x,y) : (std\_1(x,y) < TH1) \} \quad -(E3)$$

$$std\_1(x,y) = \sum_{i=-N2}^{N2} |I(x+i,y) - mean\_1(x,y)| \quad -(E3a)$$

$$mean\_1(x,y) = \sum_{i=-N2}^{N2} I(x+i,y)/C1 \quad -(E3b)$$

$$local\_histogram\_set(x,y) = \{ md\_sum(x+i,y) : (-N3 \leq i \leq N3) \} \quad -(E4)$$

$$histogram\_matching(x,y) = \sum_{n=N4a}^{N4b} |picture\_histogram[n] * local\_histogram(x,y)[n]| \quad -(E5)$$

FIG. 3

$a(x,y) = a1(x,y)*a2(x,y)*a3(x,y)$
$= \text{LUT1}(\text{md\_sum}(x,y))*\text{LUT2}(\text{std\_deviation}(x,y))*$
$\text{LUT3}(\text{histogram\_matching}(x,y))$ -(E6)

$$\begin{cases} \text{std\_deviation}(x,y) = \sum_{i=-N5}^{N5} |I(x+i,y) - \text{mean\_2}(x,y)| & -(E6a) \\ \text{mean\_2}(x,y) = (I(x-2,y) + 2*I(x-1,y) + 2*I(x,y) + 2*I(x+1,y) + I(x+2,y) + 4)/8 & -(E6b) \end{cases}$$

FIG. 4

$$a(x,y) = a1(x,y)*a2(x,y)*a3(x,y)$$
$$= \text{LUT1}(\text{md\_sum\_adjust}(x,y))*\text{LUT2}(\text{std\_deviation}(x,y))*$$
$$\text{LUT3}(\text{histogram\_matching}(x,y)) \quad -(E7)$$

$$\begin{cases} \text{md\_sum\_adjust}(x,y) = \text{md\_sum}(x,y) - \text{md\_sum\_std}(x,y)*\text{Gain} \quad -(E7a) \\ \text{md\_sum\_std}(x,y) = \sum_{i=-N6}^{N6} |\text{md\_sum}(x+i,y) - \text{md\_sum\_mean}(x,y)| \quad -(E7b) \\ \text{md\_sum\_mean}(x,y) = (\text{md\_sum}(x-2,y) + 2*\text{md\_sum}(x-1,y) + 2*\text{md\_sum}(x,y) + \\ \qquad 2*\text{md\_sum}(x+1,y) + \text{md\_sum}(x+2,y) + 4)/8 \quad -(E7c) \end{cases}$$

FILTER FOR VIDEO STREAM

This application claims the benefit of Taiwan application Serial No. 100112489, filed Apr. 11, 2011, the subject matter of which is incorporated herein by reference.

BACKGROUND OF THE INVENTION

1. Field of the Invention

The invention relates in general to a filter for video streams, and more particularly to a filter for removing noises in video streams by utilizing a low-cost time-domain filtering technique.

2. Description of the Related Art

Video streams carrying diversified dynamic video data present various information, events, news, activities, comments, thoughts and creativities by vivid, lively, user-friendly and intuitive approaches, and are thus an essential constitution in the modern information society.

SUMMARY OF THE INVENTION

Video streams inevitably contain noises, as the noises are induced into video streams during processes from filming, capturing, transmission and/or playback of dynamic video/audio. The noises not only interfere dynamic video presented by video streams and undesirably affect the playback quality of the dynamic video, but also result visual discomfort to a viewer. Therefore, it is necessary to de-noise video streams by filtering, so as to reduce noise interferences in video streams and enhances video quality.

Video streams present dynamic video by a series of static pictures, and noises (e.g., additive white Gaussian noise) are randomly distributed among the pictures. Noises in video streams may be filtered and removed (i.e., de-noised) by time-domain filtering. When de-noising a current picture, the time-domain filtering provides a filtered picture by weighted combining a current picture and its previous picture as an outcome of the de-noising process to replace the current picture.

During time-domain filtering, it is essential to attend to both de-noising effects as well as motion smoothness of the video. When providing the weighted combined filtered picture, the filtered picture appears similar to the previous picture supposing the weighting of the previous picture is too large. As a result, since the filtered picture appears similar to the previous picture, the dynamic video consisted of the filtered picture and the previous picture occurs as a picture delay to degrade the motion smoothness of the video.

In the view of the above, the present invention is aimed to maintain a balance between de-noising effects and maintaining motion smoothness, so that not only noises are reduced but also the motion smoothness of video is appropriately upheld. When performing de-noising according to the present invention, a difference between a previous picture value (e.g., a brightness of a pixel in a previous picture) and a current picture value (e.g., a brightness of a pixel in a current picture) in a neighborhood of each pixel is accumulated to provide a corresponding motion difference. A series of system analysis is performed on the motion differences of the pixels to distinguish between motion parts and noise parts of pictures according to the motion differences of the pixels. For a pixel with a small motion difference, system analysis is performed to further determine whether the pixel corresponds to a less dynamic part (e.g., a still background) in a motion picture, and the previous picture value may be employed to de-noise the pixel when the result is affirmative. Conversely, for a pixel corresponding to a more highly dynamically moving part (e.g., fast moving object in a motion picture), its motion difference is larger. However, since a naked eye is less sensitive to noises at highly dynamically moving parts, a weighting of the previous picture value may be suppressed when performing time-domain filtering to prevent degradation of the motion smoothness.

According to an aspect of the present invention, a filter for a video stream is provided. The video stream displays a previous picture and a current picture on a plurality of pixels. The previous picture comprises a plurality of previous picture values, the present picture comprises a plurality of current picture values, and the previous picture and the current picture respectively correspond a pixel. The filter of the present invention de-noises the current picture by performing time-domain filtering to provide a corresponding filtered picture to replace the current picture.

In an embodiment, the filter of the present invention comprises a motion difference calculator, a histogram counter, a histogram matching module, a filter value calculator, a blender, a noise level module, a look-up table (LUT) module, and a memory.

The motion difference calculator accumulates a difference between the previous picture value and the current picture value in a first neighborhood of each pixel to provide a corresponding motion difference for each pixel. The histogram counter is coupled between the motion difference calculator and the filter value calculator, and provides a picture histogram by performing histogram counting on the motion differences of the pixels. The histogram counter also performs histogram counting on the motion difference in a second neighborhood of each pixel to provide a corresponding local histogram for each pixel.

The histogram counter further calculates an average of the current picture value in a fifth neighborhood of each pixel, and accumulates a difference between the current picture value and the average to determine whether the motion difference corresponding to each pixel is to be collected into a noise histogram set. The histogram counter performs histogram counting on the motion differences of the noise histogram set to provide a corresponding noise histogram. The noise histogram corresponds to a plurality of bins each corresponding to a value range. The histogram counter counts in the noise histogram set the number of motion differences matching the value ranges to provide a corresponding noise histogram count value for each bin in the noise histogram.

The noise level module is coupled to the histogram counter, and provides a corresponding noise level according to the noise histogram. In the noise histogram, the bin corresponding to the largest noise histogram count value is a noise reference bin, and the noise level module provides the noise level according to the value range corresponding to the noise reference bin and a non-inverse correlation. That is, the current picture is given a greater noise level when the noise reference bin corresponds to a greater value range.

The histogram matching module is coupled between the histogram counter and the filter value calculator, and provides a corresponding a histogram matching value for each pixel according to the picture histogram and the local histogram corresponding to each pixel. The picture histogram and the local histogram respectively correspond to a plurality of bins. The picture histogram comprises a picture histogram count value in each bin, and the local histogram comprises a local histogram count value in each bin. The histogram matching module accumulates a correlation of the local histogram count value and the picture histogram count value in a predetermined number of bins among the bins to provide the histogram matching value. For example, a product of the local histogram count value and the picture histogram count value in the predetermined number of bins is accumulated to provide the histogram matching value.

The filter value calculator is coupled to the motion difference calculator, and provides a filter value for each pixel according to each motion difference corresponding to each pixel. The blender is coupled to the filter value calculator, and blends the previous picture value and the current picture value into a filtered picture value according to a first weighting positively correlated with the filter value and a second weighting inversely correlated with the filter value to provide a corresponding filtered picture value. By combining the filtered picture values of the pixels, the filtered picture can be provided.

The filter value calculator provides a corresponding histogram matching filter reference value, a motion difference adjustment filter reference value and a picture standard deviation filter reference value for each pixel, and provides the filter value according to the three filter reference values. The filter value may respectively be positively correlated with the three filter reference values. For example, the filter value is a product of the three filter reference values, and is directly proportional to the three filter reference values.

The filter value calculator maps the corresponding histogram matching value of each pixel to the corresponding histogram matching filter reference value according to a histogram matching mapping relation. The filter value calculator selects one from a plurality of histogram matching mapping relations according to a noise level provided by the noise level module, and maps the histogram matching value to the corresponding histogram matching filter reference value according to the selected histogram matching mapping relation.

The histogram matching mapping relations respectively correspond to a noise level range and a threshold, and the filter value calculator selects the corresponding histogram matching mapping relation according to the noise level range of the noise level. The threshold corresponding to each histogram matching mapping relation is inversely correlated with the noise level range. That is to say, a histogram matching mapping relation corresponding to a greater noise level range corresponds to a smaller threshold. In an embodiment, the histogram matching mapping relations map a histogram matching value less than the threshold to a histogram matching filter reference value in a constant, and map a histogram matching value greater than the threshold to a histogram matching filter reference value not less than the constant.

As for the motion difference adjustment filter reference value, the filter value calculator provides a corresponding motion difference adjustment filter reference value for each pixel according to the motion difference corresponding to each pixel, and maps the motion difference adjustment value corresponding to each pixel to the motion difference adjustment filter reference value according to a motion difference adjustment mapping relation.

In an embodiment, the motion difference adjustment value of each pixel may equal to the motion difference of each pixel. In another embodiment, the filter value calculator weighted accumulates each motion difference in a third neighborhood of each pixel to provide a motion difference average, and accumulates a difference between each motion difference and the motion difference average in each third neighborhood to provide a motion difference discrepancy for each pixel. The filter value calculator then provides the motion difference adjustment value for each pixel according to a product of the motion difference discrepancy corresponding to each pixel and a gain. The gain may be non-inversely correlated with the noise level. For example, a current picture corresponding to a greater noise level also corresponds to a greater gain.

Similar to the principle of the histogram matching mapping relations, the filter value calculator also selects one form a plurality of motion difference adjustment mapping relations according to the noise level, and maps the motion difference adjustment value corresponding to each pixel to the corresponding motion difference adjustment filter reference value according to the selected motion difference adjustment mapping relation. The filter range corresponding to each motion difference adjustment mapping relation is positively correlated with the noise level range. That is, a motion difference adjustment mapping relation corresponding to a greater noise level range also corresponds to a greater filter range. In an embodiment, the motion difference adjustment mapping relations map a motion difference adjustment value beyond the filter range to a motion difference adjustment filter reference value in a constant, and map a motion difference adjustment value within the filter range to a motion difference adjustment filter reference value not less than the constant.

As for the picture standard deviation filter reference value, the filter calculator provides a corresponding picture standard deviation for each pixel according to the corresponding current picture value of each pixel, and maps the picture standard deviation corresponding to each pixel to the picture standard deviation filter reference value according to a picture standard deviation mapping relation.

The filter value calculator weighted accumulates each current picture value in a fourth neighborhood of each pixel to provide a picture value average, and accumulates a difference between each picture value and the picture value average in each fourth neighborhood to provide the corresponding picture standard deviation of each pixel.

The filter value calculator also selects one from a plurality of picture standard deviation mapping relations according to the noise level, and maps the picture standard deviation to the corresponding picture standard deviation filter reference value according to the selected picture standard deviation mapping relation. Each picture standard deviation mapping relation corresponds to a noise level range and a filter range, and the filter value calculator selects the corresponding picture deviation mapping relation according to the noise level range of the noise level. Similar to the motion difference adjustment mapping relations, the filter range corresponding to each picture standard deviation mapping relation is positively correlated with the noise level range. The standard deviation mapping relations map a picture standard deviation beyond the filter range to a picture standard deviation filter reference value in a constant, and map a picture standard deviation within the filter range to a picture standard deviation filter reference value not less than the constant.

The present invention implements a histogram counter, a histogram matching module, a noise level module and a filter value calculator to perform system analysis, so that without performing complicated motion detection, the present invention is capable of attending to both motion smoothness and de-noising effects during time-domain filtering. The motion detection is performed between the pictures of dynamic video according to a sum of absolute difference (SAD) to detect associated information such as motion vectors of parts of video. According to associated information including the motion vectors, time-domain filtering may be performed between the current picture and the previous picture along with the motion vectors. For example, when a part displayed at a first pixel in the previous picture is moved to a second pixel in the current picture, the filtered picture value of the second pixel may be weighted combined from the previous picture value of the first pixel and the current picture value of the second pixel. However, motion detection requires immense hardware and software resources that add up to higher implementation costs, and is thus unfavorable to be extensively applied in the de-noising technique. In contrast, without performing any motion detection, the present invention is suitable for lost-cost applications that have limited hardware and software resources, such as a portable playback device, e.g., a mobile phone.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
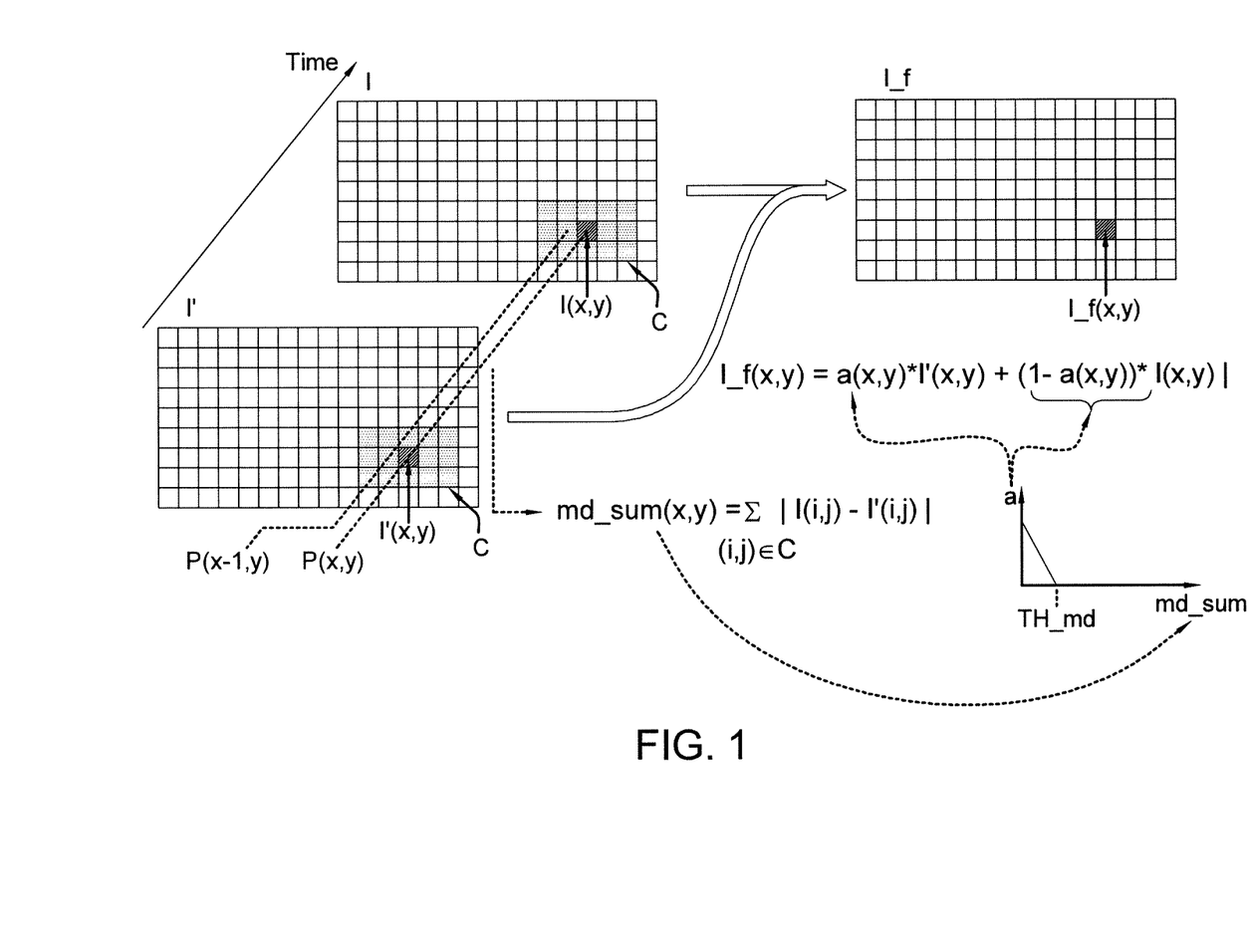
FIG. 1 is a schematic diagram illustrating a concept of performing time-domain filtering according to an embodiment of the present invention.

FIG. 1 shows a schematic diagram depicting a concept of time-domain filtering according to an embodiment of the present invention. To de-noise a current picture I in a video stream, in the present invention, a time-domain filtering is applied to a previous picture I' and the current picture I in the video stream to provided a filtered picture I_f as a result of the de-noising. The previous picture I' and the current picture I may be two consecutive frames or two consecutive fields of the same type. For example, the previous picture I' and the current picture I may be two consecutive odd fields, between which is an even field. Each picture corresponds to a plurality of pixels, e.g., a pixel $P(x, y)$ and a neighboring pixel $P(x-1, y)$ on a same horizontal line, as shown in FIG. 1. Each pixel of the pictures has a corresponding pixel value. For example, the pixel $P(x, y)$ corresponds to a picture value $I'(x, y)$ in the previous picture I, and corresponds to a picture value $I(x, y)$ in the current picture I. The picture values may be brightness values of the pixels, e.g., a Y component value in a YUV color system. In an 8-bit application, the previous picture value $I'(x, y)$ and the current picture value $I(x, y)$ may be between 0 and 255 (greater than or equal to 0 and smaller than or equal 255). Filtering the current picture I in time domain is to generate a corresponding filtered picture value $I\_f(x, y)$ respectively identified for each pixel $P(x, y)$ to accordingly provide the filtered picture I_f.

A filter value $a(x, y)$ is obtained for each pixel $P(x, y)$, and a weighting combination is performed according to the filter value $a(x, y)$: $I\_f(x,y)=a(x,y)*I'(x,y)+(1-a(x,y))*I(x,y)$, to obtain the filtered picture value $I\_f(x, y)$. In the above weighting combination, the weighting of the previous picture value $I'(x, y)$ is directly proportional to (positively correlated with) the filter value $a(x, y)$; whereas the weighting of the current picture value $I(x, y)$ is inversely correlated with the filter value $a(x, y)$. More specifically, the larger the value of the filter value $a(x, y)$ gets, the greater is the filtering effect, and the more similar the filtered picture value $I\_f(x, y)$ is to the previous picture value $I'(x, y)$. Conversely, the smaller the value of the filter value $a(x, y)$ is, the weaker is the filtering effect, and the more similar the filtered picture value $I\_f(x, y)$ is to the original current picture value $I(x, y)$.

The filter value may be greater than or equal to 0 and smaller than or equal to 1. As previously described, in the event that the filter value $a(x, y)$ is inappropriately increased to enlarge the filtering effect, the filtered picture value $I\_f(x, y)$ becomes overly similar to the previous picture value $I'(x, y)$ such that an original smoothly moving video becomes immobile or lagging, thereby degrading the motion smoothness of the video. Therefore, it is a focus of the time domain filtering to attend to both de-noising and filtering effects as well as motion smoothness when setting the filter value $a(x, y)$. Hence, in the present invention, differences $|I(i,j)-I'(i,j)|$ between previous picture values $I'(i, j)$ and current picture values $I(i, j)$ of pixels $P(i, j)$ within a predetermined neighborhood C of each pixel $P(x, y)$ are accumulated, so as to provide a corresponding motion difference $md\_sum(x, y)$ for each pixel $P(x, y)$. The corresponding filter value $a(x, y)$ is then determined after systematically analyzing the motion differences $md\_sum(x, y)$ of the pixels $P(x, y)$.

According to the motion differences of the pixels $P(x, y)$ and further analysis, the present invention is able to appropriately identify whether the pixels $P(x, y)$ correspond to highly dynamically moving parts in the video without carrying out any motion detection. When the pixel $P(x, y)$ corresponds to less dynamically moving parts, the corresponding motion difference $md\_sum(x, y)$ is correspondingly small. The human eye is more sensitive to noises with respect to less dynamic backgrounds in the video, and so de-noising may be performed with a higher filter value $a(x, y)$. In contrast, when the pixel $P(x, y)$ corresponds to a highly dynamically moving part, the corresponding motion difference $md\_sum(x, y)$ is correspondingly large. The human eye is less sensitive to noises with respect to highly dynamic backgrounds in the video, and so de-noising may be performed with a lower or even zero filter value $a(x, y)$ to maintain the motion smoothness. Conceptually, a threshold TH_md may be defined according to the motion differences $md\_sum(x, y)$ and further analysis. The filter value may be set to a lower value when the motion difference $md\_sum(x, y)$ is greater than the threshold TH_md; or, the filter value may be set according to an inversely correlation when the motion difference is lower than the threshold TH_md, so that smaller the motion difference $md\_sum(x, y)$ is, the greater the filter value $a(x, y)$ gets.

Figure 2:
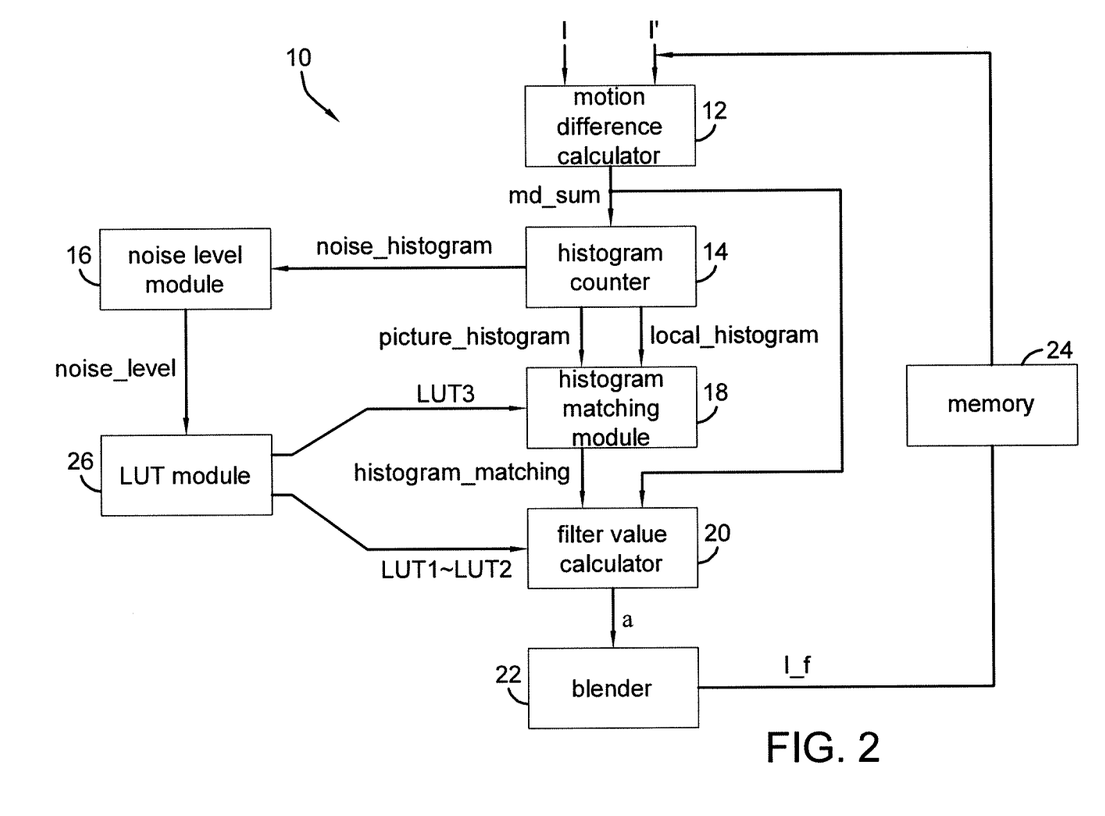
FIG. 2 is a schematic diagram of a filter according to an embodiment of the present invention.

FIG. 2 shows a filter 10 according to an embodiment of the present invention. The filter 10 comprises a motion difference calculator 12, a histogram counter 14, a histogram matching module 18, a filter value calculator 20, a blender 22, a noise level module 16, a look-up table (LUT) module 26 and a memory 24. As described with reference to FIG. 1, the filter 10 may be a time-domain filter for identifying a corresponding filter value $a(x,y)$ for each pixel $P(x,y)$, and to provide the filtered picture $I\_f(x, y)$ according to weightings of the previous picture value $I'(x, y)$ and the current picture value $I(x, y)$, as shown in an equation E0 in FIG. 3. The filter value $a(x, y)$ may be greater than or equal to 0 and smaller than or equal to 1.

Figure 3:
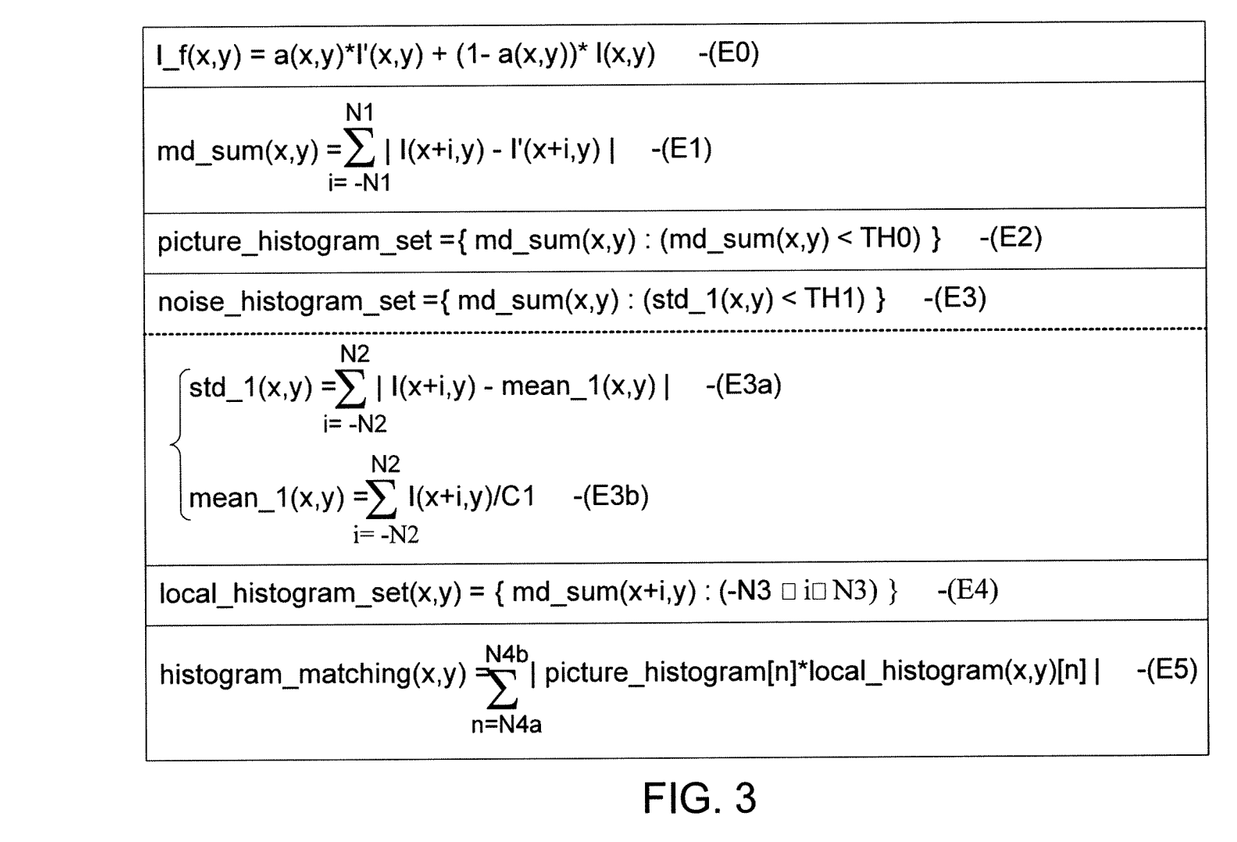
FIGS. 3 to 5 are schematic diagrams illustrating operational embodiments of elements in FIG. 2.

In the filter 10, the motion difference calculator 12 first accumulates a difference $|I(x+i,y)-I'(x+i,y)|$ between the previous picture value $I'(x+1, y)$ and the current picture value $I(x+1, y)$ of each pixel $P(x+i, j)$ in a neighborhood $i=-N1$ to N1 (where N1 equals 2, for example) of each pixel $P(x, y)$, so as to provide a corresponding motion difference md_sum(x, y) for each pixel P(x, y), as indicated by an equation E1 in FIG. 3. In this embodiment, corresponding motion differences md_sum(x, y) are calculated with respect to left N1 pixels P(x−N1, y) to P(x−1, y) and right N1 pixels P(x+1, y) to P(x+N1, y) located at a same horizontal line of each pixel P(x, y), so that not only a data accuracy of the motion differences md_sum(x, y) is optimized but also the operation resource required for calculating motion differences becomes less. Since the picture values of the pixels at a same horizontal line are loaded into a same horizontal line buffer, only one horizontal line buffer is needed to calculate motion differences of neighboring pixels at the same horizontal line as indicated by the equation E1 instead of having to buffer picture values of other horizontal lines with a plurality of horizontal line buffers.

The histogram counter 14 in the filter 10 is coupled to the motion difference calculator 12, the histogram matching module 18 and the filter value calculator 20. In an embodiment, the histogram counter 14 performs histogram counting on elements of a predetermined set; that is, the histogram counter 14 sorts the elements according to values of the elements to different bins, and counts the number of the elements in each bin. For example, the histogram 14 divides values from 0 to 255 into 16 bins. An element with a value between 0 and 15 (greater than or equal to 0 and smaller than or equal to 15) is sorted to a bin 0, an element with a value between 16 to 31 is sorted to a bin 1, and so forth. A result of the histogram counting then reflects the number of elements in each bin from elements of the predetermined set; that is, the number of elements in the bin 0, the number of elements in the bin 1, and so forth.

The histogram counter 14 performs histogram counting according to the motion difference md_sum(x, y) of each pixel P(x, y) to provide a picture histogram (picture_histogram). For example, the histogram counter 14 performs histogram counting on a set (picture_histogram_set) to obtain the picture histogram (picture_histogram). As shown by an equation E2, the set (picture_histogram_set) accumulates the motion differences md_sum(x, y) of all the pixels P(x, y), and excludes values greater than or equal to a threshold TH0 of the motion differences md_sum(x, y). In an 8-bit application, the threshold TH0 is set to 256.

Further, the histogram counter 14 performs histogram counting according to motion differences of a noise histogram set (noise_histogram_set) to provide a noise histogram (noise_histogram). According to equations E3a and E3b, the present invention calculates an average mean_1(x, y) of the current picture values I(x+1, y) of a neighborhood i=−N1 to N2 (N2=2, for example) of each pixel P(x, y), and accumulates the difference |I(x+i,y)−mean_1(x+i,y)| between the current picture value I(x+i, y) and the average mean_1(x, y) to obtain a difference std_1(x, y). According to the equation E3, it is then determined whether the motion difference md_sum(x, y) corresponding to each pixel P(x, y) is to be included in the noise histogram set (noise_histogram_set). For example, for a pixel P(x, y), its corresponding motion difference md_sum(x, y) is included into the noise histogram set (noise_histogram_set) when its corresponding difference std_1(x, y) is smaller than a threshold TH 1, or else its corresponding motion difference md_sum(x, y) is excluded from the noise histogram set (noise_histogram_set). Supposing the pixel P(x, y) is located in a uniform part of the picture, differences between the current picture values I(x+i, y) in a neighborhood of the pixel P(x, y) are relatively small. However, since noises are likely to be observed in uniform parts of a picture, the equation E3 also collects motion differences of the pixels in the uniform parts of the picture to form the noise histogram set (noise_histogram_set).

After performing histogram counting according to the motion differences in the noise histogram set (noise_histogram_set), the histogram counter 14 then provides the noise histogram (noise_histogram). As previously describe, the noise histogram (noise_histogram) corresponds to a plurality of bins each corresponding to a value range. The histogram counter 14 counts the number of motion differences matching each value range to provide a corresponding noise histogram count value for each bin in the noise histogram (noise_histogram).

The noise level module 16, coupled to the histogram counter 14, provides a corresponding noise level (noise_level) according to the noise histogram (noise_histogram). In the noise histogram (noise_histogram), a bin with a largest histogram count value is regarded as a noise reference bin, and the noise level module 16 provides the noise level (noise_level) according to the value range corresponding to the noise reference bin and a non-negative correlation. That is, the current picture I is given a greater noise level (noise_level) for a greater value range corresponding to the noise reference bin.

Figure 6:
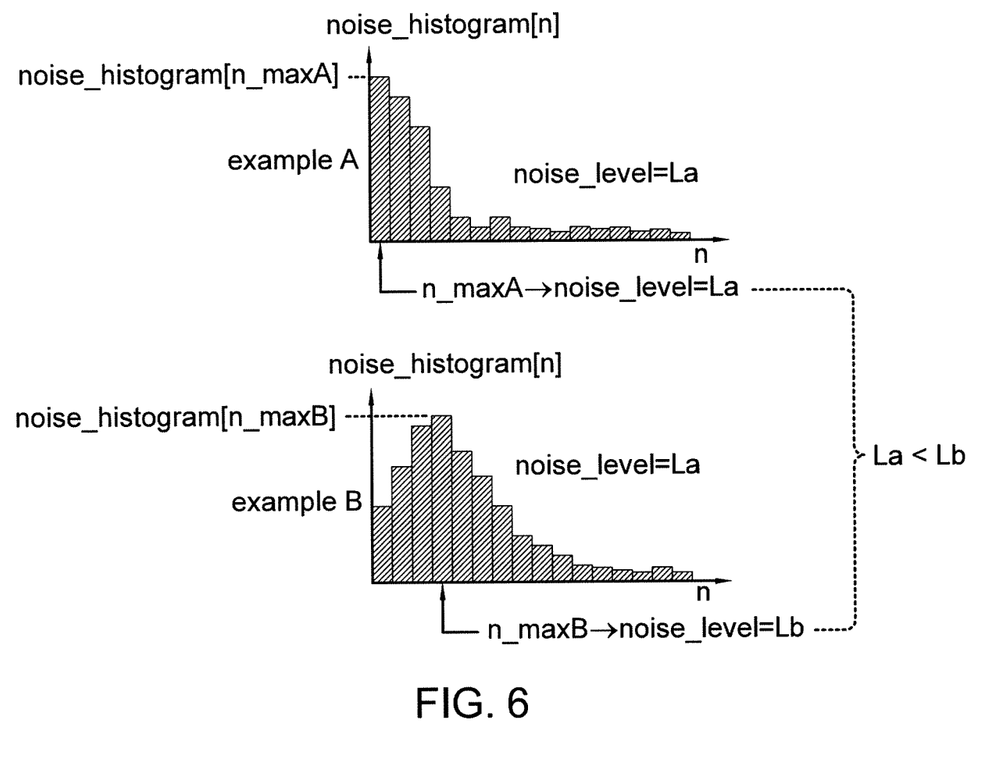
FIG. 6 is a schematic diagram illustrating operations of a noise level module in FIG. 2.

FIG. 6 shows a noise level (noise_level) corresponding to different noise histograms (noise_histogram) according to an embodiment A and an embodiment B. In FIG. 6, the noise histogram (noise_histogram) is illustrated by graphs, with a horizontal axis representing a subscript n of the bins, and a vertical axis representing count values (noise_histogram[n]) of the bins. In the noise histogram (noise_histogram) of the embodiment A, a bin with a subscript n_maxA has a maximum noise histogram count value (noise_histogram[n_max]) and is thus regarded as the noise reference bin, and accordingly the subscript n_maxA sets a value of the noise level (noise_leve) as La. Similarly, in the noise histogram (noise_histogram) of the embodiment B, a bin with a subscript n_maxB has a maximum noise histogram count value (noise_histogram[n_max]), and accordingly the subscript n_maxB sets a value of the noise level (noise_leve) as Lb. By comparing the embodiments A and B, the Lb is greater than La since the bin corresponding to the subscript n_maxB has a greater value range. It is observed from the noise histogram (noise histogram) of the embodiment B that, motion differences of the noise histogram set (noise_histogram_set) are densely located at bins of greater value ranges, meaning that values of the motion differences are generally higher, so that the noise histogram (noise_histogram) of the embodiment B may correspond to a greater noise level (noise_level).

Again with reference to FIG. 2, apart from the abovementioned picture histogram (picture_histogram) and noise histogram (noise_histogram), the histogram counter 14 also performs histogram counting on the motion difference md_sum(x+i, y) of each pixels P(x+i, y) in a neighborhood i=−N3 to N3 (N3=15, for example) of each pixel P(x, y), so as to provide a local histogram (local_histogram(x, y)) for each pixel P(x, y). As shown by an equation E4 in FIG. 3, the motion differences md_sum(x+i, y) of the pixels P(x+i, y) neighboring the pixels P(x, y) are grouped in a local histogram set (local_histogram_set(x, y)), according to which the histogram counter 14 performs histogram counting to obtain the local histogram (local_histogram(x, y)).

The histogram matching module 18 is coupled between the histogram counter 14 and the filter value calculator 20. The histogram matching module 18 provides each pixel P(x, y) a corresponding histogram matching value (histogram_matching(x, y)) according to the picture histograms (picture_histogram) and the local histograms (local_histogram(x, y)) corresponding to the pixels P(x, y), as shown by the equation E4 in FIG. 3. The histogram counter 14 provides the picture histogram (picture_histogram) and local histogram (local_histogram) according to a same bin plan, in a way that both correspond to a plurality of same bins. Therefore, the picture histogram (picture_histogram) comprises a corresponding picture histogram count value (picture_histogram[n]) at an n bin, and the local histogram (local_histogram(x, y)) comprises a corresponding local histogram count value (local_histogram(x, y)[n]) in the n bin. The histogram matching module 18 accumulates a correlation between the local histogram count value (local_histogram(x, y)[n]) and the picture histogram count value (picture_histogram[n]) within a predetermined number of bins n=N4a to N4b among the bins. For example, a product of the local histogram count value (local_histogram(x, y)[n]) and the picture histogram count value (picture_histogram[n]) within a predetermined number of bins are accumulated to provide the histogram matching value (histogram_matching(x, y)). In one embodiment, N4a and N4b are respectively 0 and 7.

Figure 7:
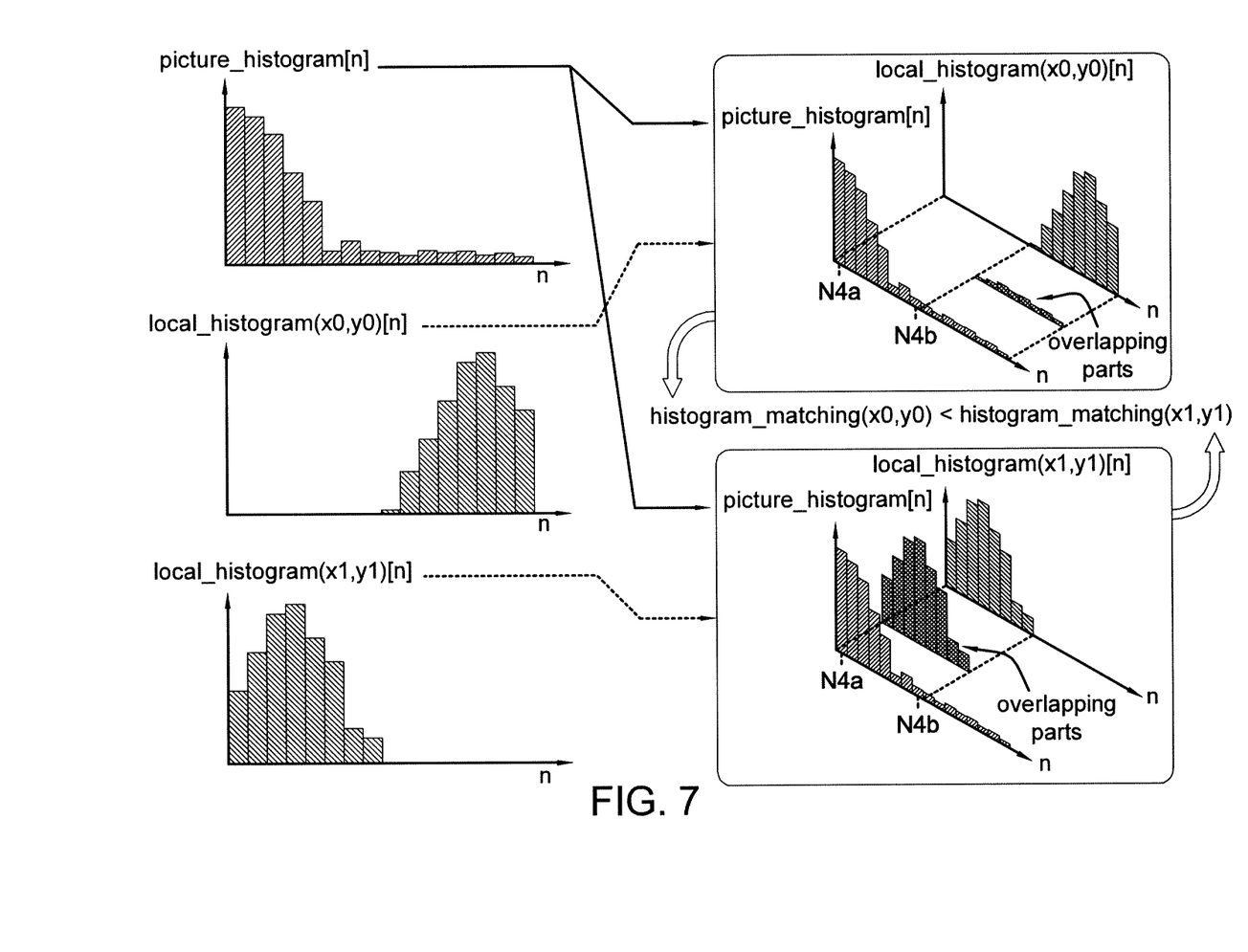
FIG. 7 is a schematic diagram illustrating operations of a histogram matching module in FIG. 2.

FIG. 7 illustrates an example of calculating the histogram matching value by utilizing two different pixels of a same picture. It is observed from the local histogram (local_histogram(x0, y0)) corresponding to a pixel P(x0, y0) that, motion differences are densely located at bins with greater values. Conversely, in the picture histogram (picture_histogram) representing overall characteristics of the picture, motion differences are densely located at bins with smaller values, which means overlapping parts of the local histogram (local_histogram(x0, y0)) and the picture histogram (picture_histogram) are quite small. In the local histogram (local_histogram(x1, y1)) corresponding to a pixel P(x1, y1), a distribution therein is similar to that in the picture histogram (picture_histogram), and so overlapping parts of the two histograms are much larger. As a result, the histogram matching value (histogram_matching(x1, y1) corresponding to the pixel P(x1, y1) is accordingly greater than the pixel P (x0, y0).

Again referring to FIG. 2, the filter value calculator 20 in the filter 10, coupled to the motion difference calculator 12 and the histogram matching module 18, provides a corresponding filter value a(x, y) for each pixel according to the motion difference md_sum(x, y) and the histogram matching value (histogram_matching(x, y)) corresponding to each pixel P(x, y). The blender 22 is coupled to the filter value calculator 20. For a filter value a(x, y) corresponding to each pixel P(x,y), the previous picture value I'(x, y) and the current picture value I(x, y), the blender 22 blends the previous picture value I'(x, y) and the current picture value I(x, y) respectively according to a weighting positively correlated with the filter value a(x, y) and a weighting (1–a(x, y)) inversely correlated with the filter value a(x, y) to provide a corresponding filtered picture value I_f(x, y). By combining the filtered picture values I_f(x, y) of the pixels P(x, y), the filtered picture I_f can be provided.

The filter value calculator 20 provides each pixel P(x, y) three corresponding filter reference values a1 (x, y), a2(x, y) and a3(x, y), and then provides the filter value a(x, y) according to the three filter reference values. The filter value a(x, y) may be positively correlated with the three filter reference values a1 (x, y) to a3(x, y), respectively. For example, the filter value a(x, y) may be a product of the three filter reference values a1 (x, y) to a3(x, y), and is respectively directly proportional to the three filter reference values. Equations E6 and E6a to E6b in FIG. 4, and equations E7 and E7a to E7c, respectively show two types of calculations for the filter value a(x, y) according to different embodiments of the present invention.

Figure 4:
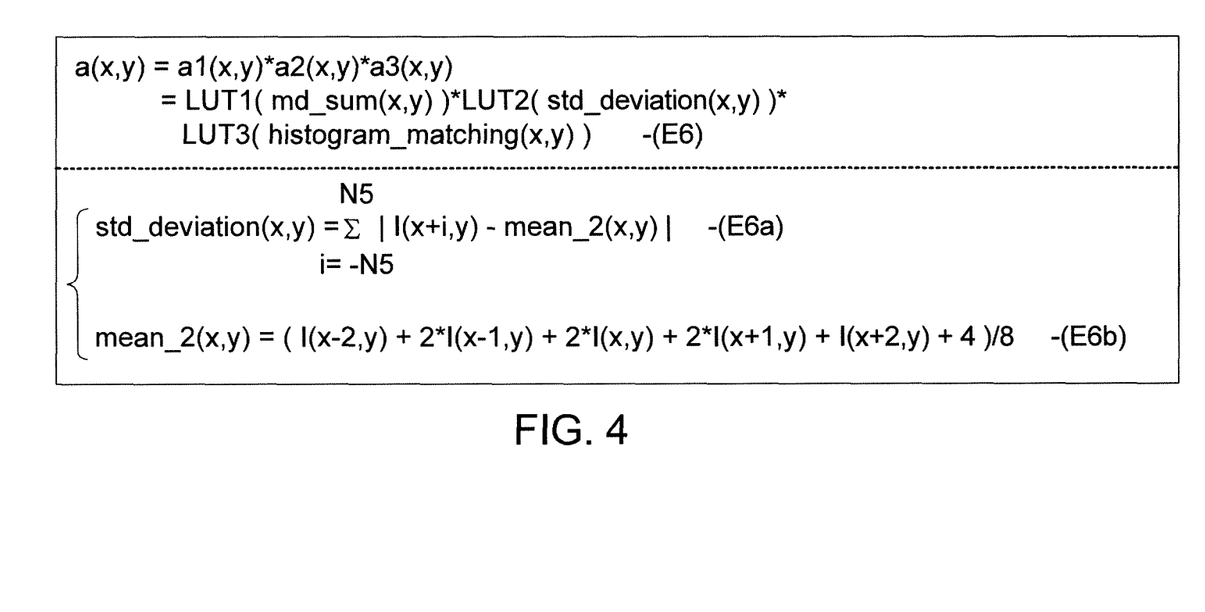

In the embodiment shown in FIG. 4, the filter value calculator 20 maps the motion difference md_sum(x) of each pixel P(x, y) to a filter reference value LUT1(md_sum(x, y)) to serve as the filter reference value a1 (x, y) according to a mapping relation LUT1. In The embodiment shown in FIG. 5, a corresponding motion adjustment value md_sum_adjust(x, y) is provided for each pixel P(x, y) according to the motion difference md_sum(x, y) corresponding to each pixel P(x, y); the corresponding motion adjustment value md_sum_adjust(x, y) of each pixel P(x, y) is mapped to a motion difference adjustment reference value LUT1(md_sum_ajdust(x, y)) to serve as the filter reference value a1(x, y) according to a motion difference adjustment mapping relation LUT1.

Figure 5:
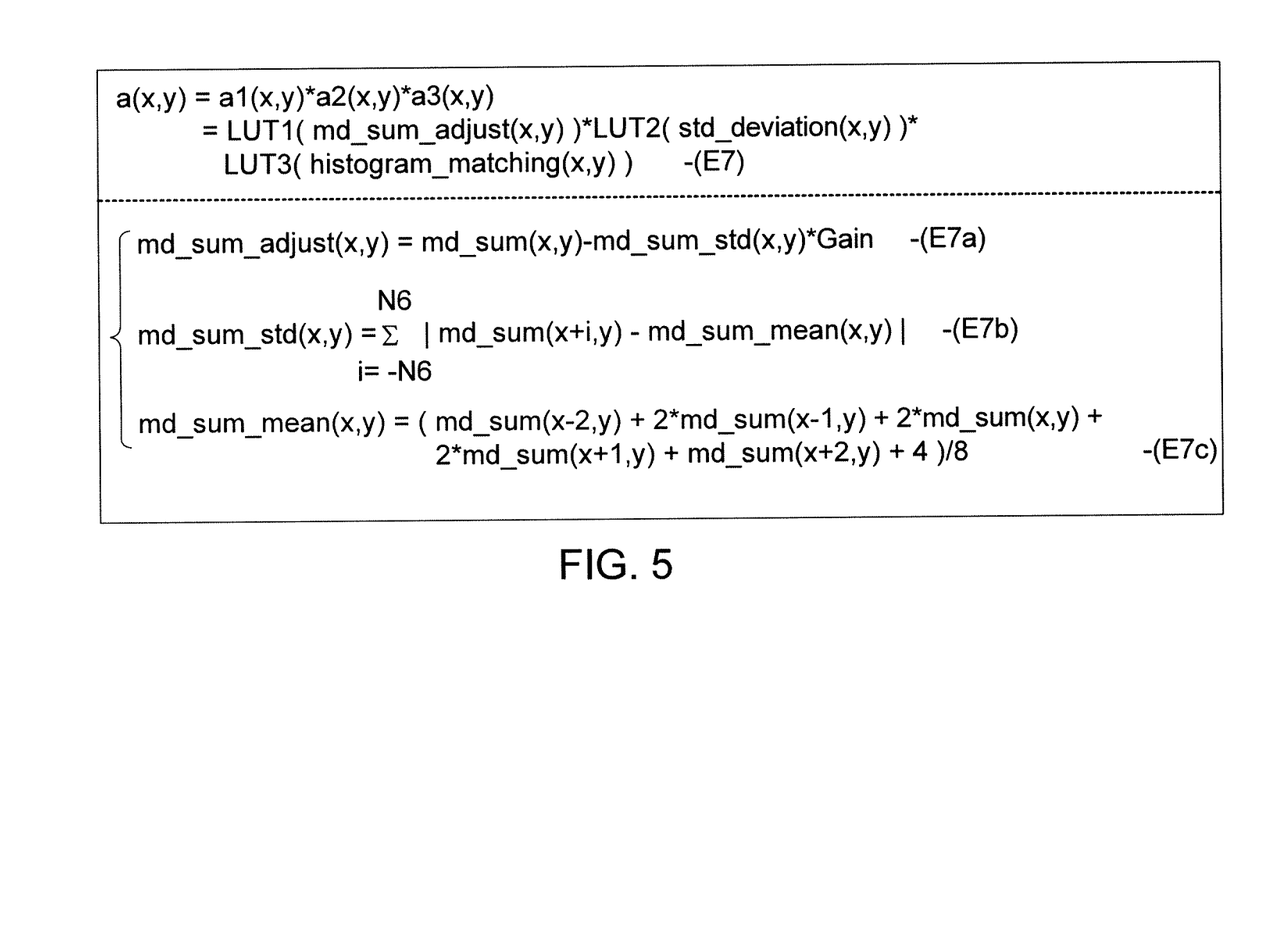

As shown by the equations E7a to E7c in FIG. 5, in the present invention, a corresponding motion difference average mid_sum_mean(x+i, y) is provided for each pixel P(x, y) by accumulating the motion difference md_sum(x+i, y) with weightings in a neighborhood i=–N6 to N6 of each pixel P(x, y), and a difference |md_sum(x+i,y)–md_sum_mean(x,y)| between the motion difference md_sum(x+i, y) and motion difference average md_sum_mean(x, y) in the neighborhood is accumulated to provide a motion difference discrepancy md_sum_std(x, y) for each pixel P(x, y). The filter value calculator 20 then provides the motion difference adjustment value md_sum_ajdust(x, y) for each pixel P(x, y) according to the motion difference md_sum(x, y) and a product of the motion difference discrepancy md_sum_std(x, y) corresponding to each pixels P(x, y) and a gain (Gain), as shown by the equation E7a. The gain (Gain) may be non-inversely correlated with the noise level (noise_level). For example, the gain (Gain) increases along with an increase in the noise level (noise_level) corresponding to the current picture.

Figure 8:
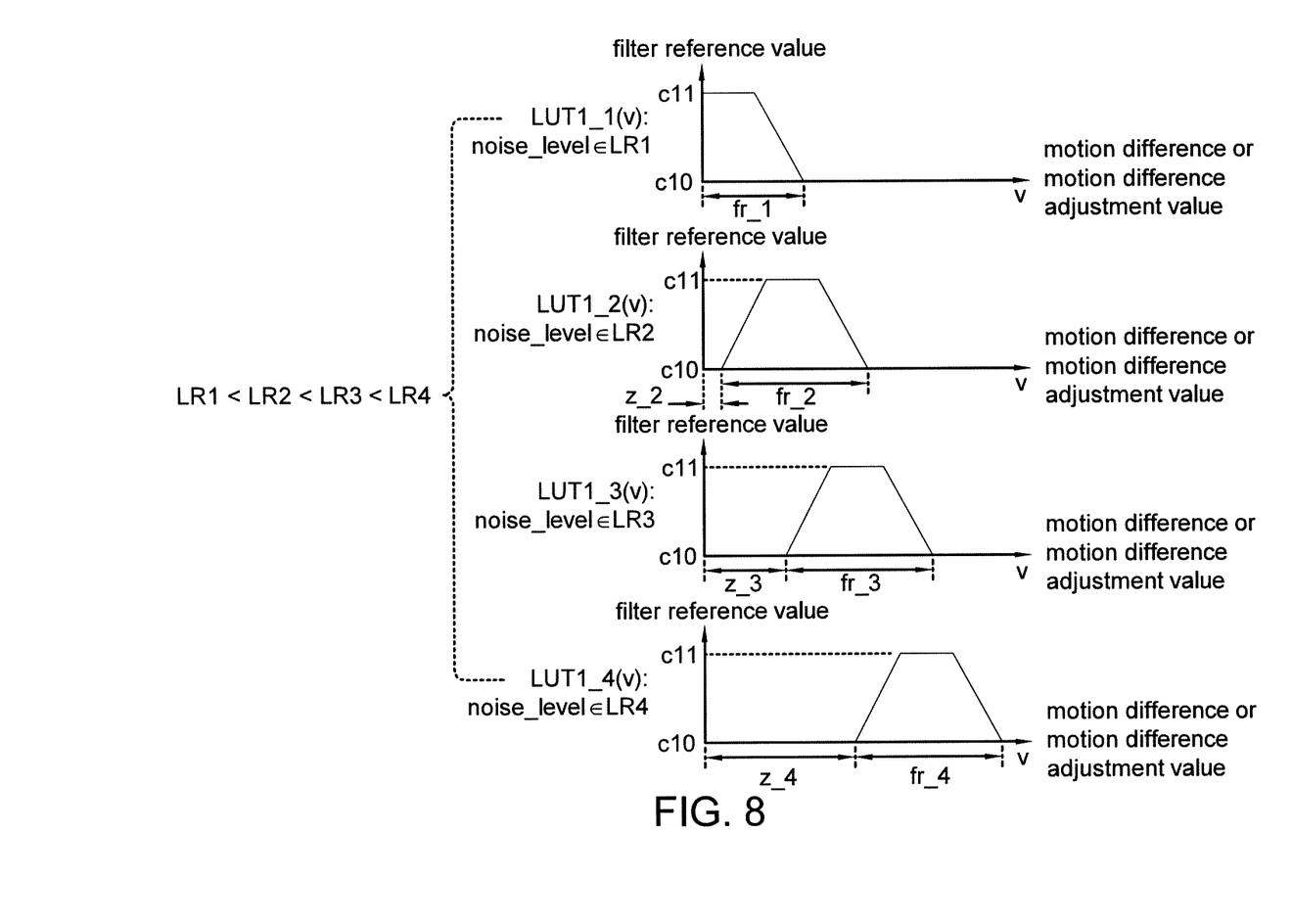
FIGS. 8 to 10 are schematic diagrams illustrating operational examples of an LUT module in FIG. 2.

In the embodiments shown in FIGS. 4 and 5, the filter value calculator 20 selects one from a plurality of motion difference adjustment mapping relations LUT1_k to serve as the motion adjustment mapping relation LUT1 in FIGS. 4 and 5 according to the noise level (noise_level). The filter value calculator 20 then maps the motion difference md_sum(x, y) (the embodiment in FIG. 4) or the motion difference adjustment value md_sum_adjust(x, y) (the embodiment in FIG. 5) of each pixel P(x, y) to the corresponding filter reference value a1(x, y). FIG. 8 shows functional graphs illustrating different motion difference adjustment mapping relations LUT1_1 to LUT1_4 in an embodiment of the present invention. In the motion difference adjustment mapping relations LUT1_k, a value v of the horizontal axis (i.e., the motion difference md_sum(x, y) in the equation E6 in FIG. 4 or the motion difference adjustment value md_sum_ajdust(x, y) in the equation E7 in FIG. 5) is mapped to a mapping value LUT1_k(v) (i.e., the filter reference value a1(x, y)) of the vertical axis. The motion difference adjustment mapping relations LUT1_1 to LUT1_4 respectively correspond to noise level ranges LR_1 to LR4 and filter ranges fr_1 to fr_4. In the present invention, the corresponding motion difference adjustment mapping relation LUT1_k is selected according to the noise level range LR_k of the noise level (noise_level) to map to the filter reference value a1(x, y). For example, for the noise level (noise_level) with a value ranging from 0 to 15, the noise level ranges Lr_1 to LR_4 may respectively be 0 to 3, 4 to 7, 8 to 11, and 12 to 15. Supposing the noise level (noise_level) corresponding to the current picture I is 2, the motion difference adjustment mapping relation LUT1_1 corresponding to the noise level range LR_1 is selected when performing time-domain filter on the current picture I.

In the embodiment shown in FIG. 8, the filter range fr_k corresponding to the motion difference adjustment mapping relation LUT1_k is positively correlated with the noise level range LR_k. That is, the filter range fr_k is also higher when a motion difference adjustment mapping relation LUT1_k corresponds to a higher noise level range LR_k. As shown in FIG. 8, the filter range of the motion difference adjustment mapping relation LUT1_k increases from fr_1 to fr_4 as the noise level range increases from LR_1 to LR_4. For example, an upper limit of the filter range fr_k is greater than an upper limit of the filter range fr_(k−1), and a lower limit of the filter range fr_k is greater than a lower limit of the filter range fr_(k−1). However, the lower limit of the filter range fr_k may be smaller than the upper limit of the filter range fr_(k−1) such that the filter ranges fr_k and fr(k−1) are partially overlapped.

Referring to FIG. 8, according to an embodiment of the present invention, the motion difference adjustment mapping relation LUT1_k maps a value beyond the filter range fr_k to a constant c10 (e.g., 0) as the filter reference value, and maps a value v within the filter range fr_k to a mapping value not less than the constant c10 as the filter reference value, e.g., a constant c11 greater than the constant c10. That is, when a value v (the motion difference md_sum(x, y) or the motion difference reference value (x, y)) corresponding to a pixel P(x, y) falls within the filter range fr_k, the pixel P(x, y) is corresponded to a greater filter reference value a1(x, y) to reinforce the filter strength. When the value v falls beyond (outside) the filter range fr_k, the filter strength is suppressed. For example, when the value v corresponding to a pixel is lower than the filter range, the pixel is likely to be kept at the current picture value instead of being strongly filtered. Therefore, for the filter ranges fr_2 to fr_4, the motion difference adjustment mapping relations LUT1_2 to LUT1_4 may also be defined with reserved ranges z_2 to z4, as shown in FIG. 8. When the value v of a pixel falls within the reserved range z_k, the corresponding filter strength is also less. It is observed from FIG. 8 that, to correspond to a higher noise level (noise_level), the upper and lower limits of the filter range fr_k are shifted to the right (to be higher) to leave a greater reserved range z_k. By appropriately leaving some little noises to a picture having a high noise level through setting a greater reserved range, preferable visual effects can be maintained.

As previously described with reference to FIG. 5, in the present invention, the filter reference value a1(x, y) is provided according to the motion difference adjustment value md_sum_adjust(x, y) of the pixel P(x, y). The design of the motion difference adjustment value is to emphasize high-contrast isolated dot-like noises in the picture, so as to filter and remove the noises by utilizing a higher filter reference value a1(x, y). From the equation E7a in FIG. 5, it is concluded that the motion difference adjustment value md_sum_ajdust(x, y) is associated with the motion difference discrepancy md_sum_std(x, y), which is for measuring the discrepancy of motion differences in the neighborhood of each pixel P(x, y). When dot-like noises occur in the neighborhood, the motion differences corresponding to the dot-like noises are deviated from motion differences of their neighboring pixels, such that the motion difference discrepancy becomes larger, which makes the motion adjustment value to fall within the filter range in the motion difference adjustment mapping relation LUT1 to suppress the dot-like noises. The gain (Gain) in the equation E71 is also for increasing the value of the motion difference discrepancy md_sum_std(x, y), so that the motion difference discrepancy md_sum_std(x, y) is even more likely to be covered by the filter range.

In FIGS. 4 and 5, the filter reference values a2(x, y) and a3(x, y) may respectively be a picture standard deviation filter reference value and a histogram matching filter reference value.

The filter value calculator 20 provides a corresponding picture standard deviation std_deviation(x, y) for each pixel P(x, y) according to the current picture value I(x, y) corresponding to each pixel P(x, y), and maps the picture standard deviation std_deviation(x, y) corresponding to each pixel P(x, y) to a picture standard deviation filter reference value LUT2 (std_deviation(x, y)), i.e., the filter reference value a2(x, y), according to a picture standard deviation mapping relation LUT2.

Referring to the equations E6a and E6b in FIG. 4, the filter value calculator 20 accumulates the current picture value I(x+i, y) with weightings in a neighborhood i=−N5 to N5 (e.g., N5=2) of each pixel P(x, y) to provide a corresponding picture average mean_2(x, y) for each pixel P(x, y), and accumulates the difference |I(x+i,y)−mean_2(x,y)| between the current picture value I(x+i, y) and the picture average mean_2(x, y) to provide a corresponding picture standard deviation std_deviation(x, y) for each pixel P(x, y).

Figure 9:
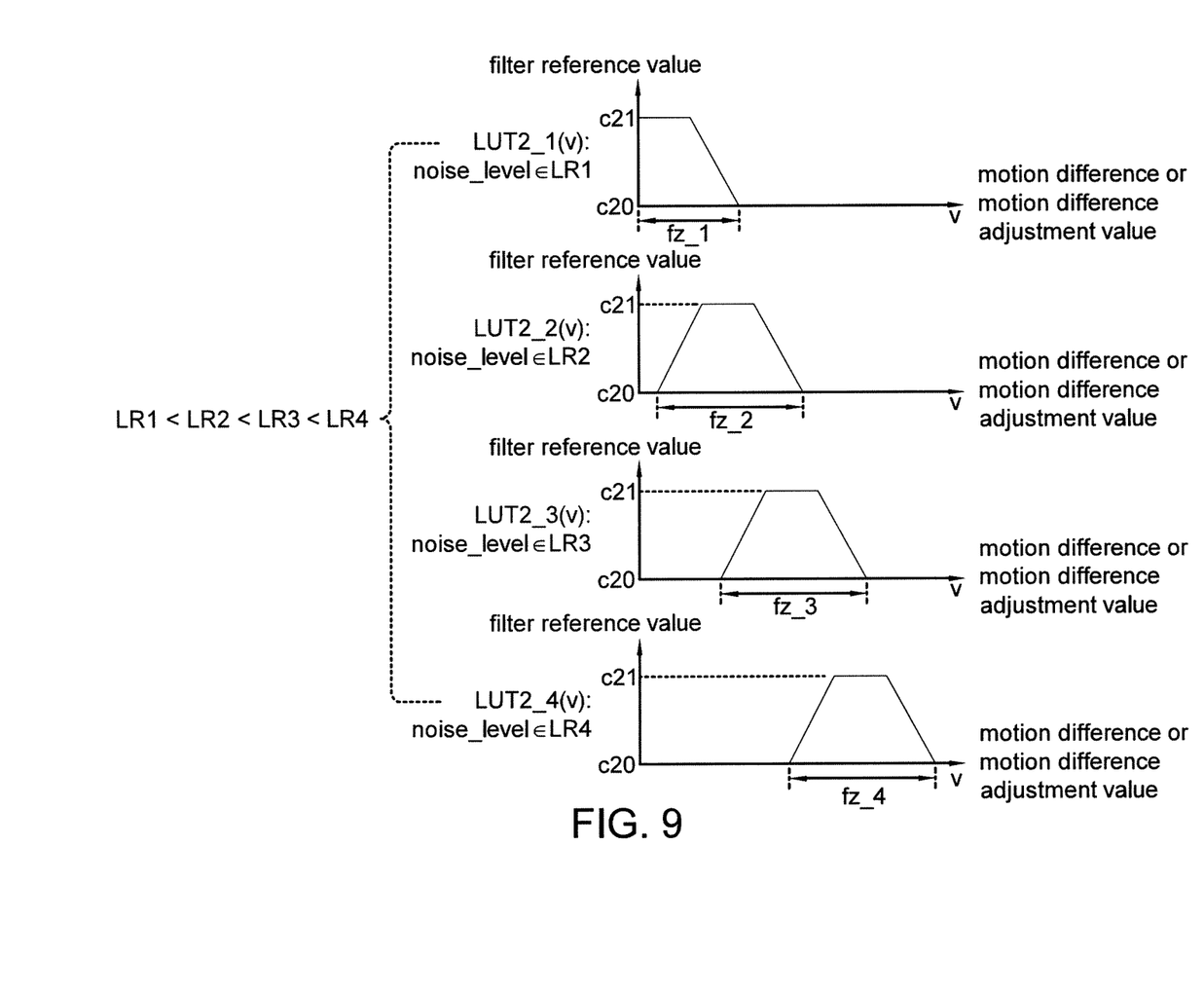

The filter value calculator 20 further selects one from a plurality of picture standard deviation mapping relations LUT2_k to serve as the picture standard deviation mapping relation LUT2 in the equations E6 and E7, and maps the picture standard deviation std_deviation(x, y) to the picture standard deviation filter reference value LUT2(std_deviation(x, y)) according to the selected picture standard deviation mapping relation LUT2. FIG. 9 shows functional graphs illustrating picture standard deviation mapping relations LUT2_1 to LUT2_4 according to an embodiment of the present invention. The picture standard deviation mapping relations LUT2_k respectively correspond to a noise range LR_k and a filter range fz_k. The filter value calculator 20 selects a corresponding picture standard deviation mapping relation LUT2_k according to the noise level range LR_k of the noise level (noise_level). Similar to the motion difference adjustment mapping relations LUT1_k, the filter range fz_k corresponding to the picture standard deviation mapping relation LUT2_k is positively correlated with the noise level LR_k. According to an embodiment of the present invention, the picture standard deviation mapping relation LUT2_k maps a value beyond the filter range fz_k to a constant c20 (e.g., 0) as the filter reference value, and maps a value v within the filter range fz_k to a mapping value not less than the constant c20 as the filter reference value, e.g., a constant c21 greater than the constant c20.

Regarding the filter reference value a3(x, y), the filter value calculator 20 maps the histogram matching value (histogram_matching(x, y)) of each pixel P(x, y) to a corresponding histogram matching filter reference value LUT3(histogram_matching(x, y)) according to a histogram matching mapping relation LUT3 to provide the filter reference value a3(x, y). The filter value calculator 20 selects one from a plurality of histogram matching mapping relations LUT3_k to serve as the histogram matching mapping relation LUT3 in the equations E6 and E7 according to the noise level (noise_level) provided by the noise level module 16, and performs mapping according to the selected histogram matching mapping relation LUT3.

Figure 10:
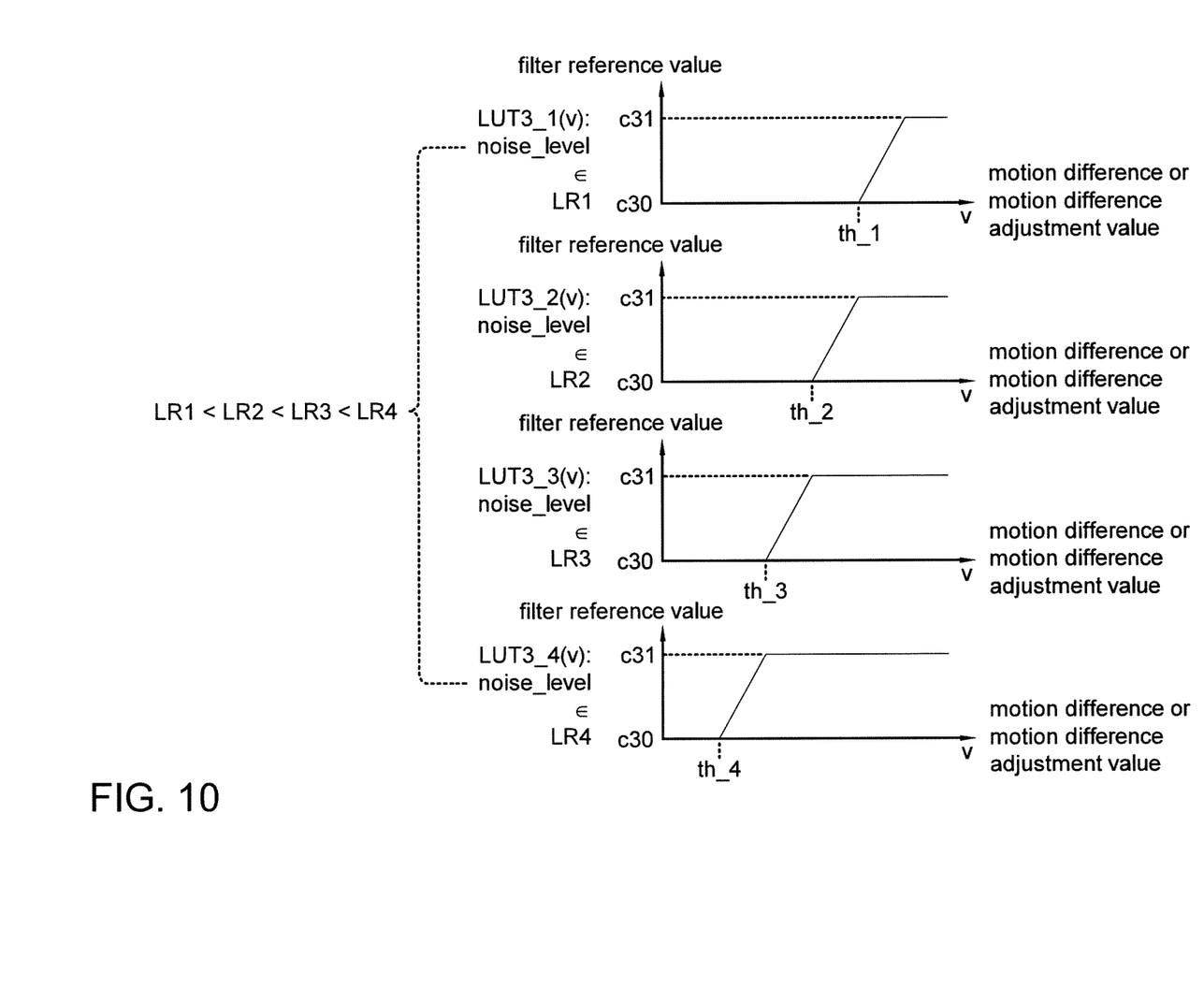

FIG. 10 shows functional graphs illustrating histogram matching mapping relations LUT3_1 to LUT3_4 according to an embodiment of the present invention. The histogram matching mapping relations LUT3_1 to LUT3_4 respectively correspond to the noise level ranges LR_1 to LR4 and thresholds th_1 to th_4. The filter value calculator 20 selects the corresponding histogram matching mapping relation LUT3_k according to the noise level range LR_k of the noise level (noise_level). The threshold th_k of the histogram matching mapping relation LUT3_k is inversely correlated with its noise level range LR_k. That is, as the noise level range LR_k corresponding to a histogram matching mapping relation LUT3_k gets larger, its corresponding threshold th_k gets smaller. In an embodiment, the histogram matching mapping relations LUT3_k maps a value v (i.e., the histogram matching value (histogram_matching(x, y)) less than the threshold th_k to a mapping value (i.e., the histogram matching filter reference value LUT3(histogram_matching(x, y)) of a constant c30 (e.g., c30=0), and maps a value v greater than the threshold th_k to a mapping value not less than the constant c30, e.g., a constant c31 greater than the constant c30.

As shown in FIG. 2, the LUT module 26 in the filter 10 may provide the motion difference adjustment mapping relation LUT1 (LUT1_1 to LUT1_4), the picture standard deviation mapping relation LUT2 (LUT2_1 to LUT2_4), and the histogram matching mapping relations LUT3 (LUT3_1 to LUT3_4). For example, the LUT module 26 may employ non-volatile memory resources allotted to the filter 10, and realizes the mapping relations by means of look-up tables (LUT). The filter value calculator 20 is then able to provide the three filter reference values a1(x, y) to a3(x, y) for each pixel P(x, y) according to the mapping relations, and to provide the filter value a(x, y) by multiplying the three filter reference values a1(x, y) to a3(x, y). Further, the blender 22 blends the current picture value I(x, y) and the previous picture value I'(x, y) with weightings according to the filter value a(x, y) to provide the filtered picture value I_f(x, y) of each pixel P(x, y). By combining the filtered picture values I_f(x, y) of the pixels P(x, y), the filtered picture I_f can be provided. The filtered picture I_f may be temporarily stored in the memory 24 (e.g., a volatile random access memory). When a next picture is to be temporally filtered, the filtered picture I_f then becomes the previous picture of the next picture.

To accommodate different applications, the present invention may also provide a plurality sets of different motion adjustment mapping relations LUT1_1 to LUT1_4, picture standard deviation mapping relations LUT2_1 to LUT2_4, and histogram matching mapping relations LUT3_1 to LUT3_4. For example, the motion adjustment mapping relations LUT1_1 to LUT1_4 utilized for one application are different from those of another application. Further, the filter range fr_k utilized in one application may also be different from that of another application. In the filter 10, the motion difference calculator 12, the histogram counter 14, the histogram matching module 18, the filter value calculator 20 and the blender 22 may all be realized by hardware, and the noise level module 16 may be realized by software/firmware.

In conclusion, compared to the prior art, the present invention implements a histogram counter, a histogram matching module, a noise level module and a filter value calculator to perform system analysis, so that without performing complicated motion detection, the present invention is capable of attending to both motion smoothness and de-noising effects during time-domain filtering. Therefore, the present invention is suitable for low-cost applications where software/hardware resources are limited, such as a portable playback device, e.g., a mobile phone.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A filter for a video stream displaying a previous picture and a current picture on a plurality of pixels of a display, the previous picture comprising a plurality of previous picture values, the current picture comprising a plurality of current picture values, with each previous picture value and each current picture value being corresponding to one of the pixels, the filter comprising:
   a motion difference calculator, for accumulating a difference between the previous picture value and the current picture value in a first neighborhood of each pixel to provide a motion difference for each pixel;
   a filter value calculator, coupled to the motion difference calculator, for providing a filter value for each pixel according to each motion difference;
   a blender, coupled to the filter value calculator, for blending each previous picture value and each current picture value to a filtered picture value according to a first weighting positively correlated with the filter value and a second weighting inversely correlated with the filter value for generating a filtered picture;
   a histogram counter, coupled to the motion difference calculator and the filter value calculator, for performing histogram counting according to each motion difference to provide a picture histogram, wherein the histogram counter performs histogram counting on each motion difference in a second neighborhood of each pixel to provide a local histogram for each pixel;
   a histogram matching module, coupled between the histogram counter and the filter value calculator, for providing a histogram matching value for each pixel according to the picture histogram and the local histogram corresponding to each pixel,
   wherein the picture histogram and the local histogram respectively correspond to a plurality of bins, the picture histogram comprises a picture histogram count value in each bin, the local histogram comprises a local histogram count value in each bin, and the histogram matching module accumulates a correlation between the local histogram count value and the picture histogram count value in the bins to provide the histogram matching value.

2. The filter according to claim 1, wherein the histogram matching module accumulates the local histogram count value and the picture histogram count value in a predetermined number of bins among the bins to provide the histogram matching value.

3. The filter according to claim 1, wherein the filter value calculator maps the histogram matching value corresponding to each pixel to a histogram matching filter reference value according to a histogram matching mapping relation, and provides the filter value according to the histogram matching filter reference value.

4. The filter according to claim 3, wherein the filter value calculator provides the filter value according to a positive correlation and the histogram matching filter reference value.

5. The filter according to claim 3, wherein the filter value calculator selects one from a plurality of histogram matching mapping relations according to a noise level, and maps the histogram matching value to the histogram matching filter reference value according to the selected histogram matching mapping relation.

6. The filter according to claim 5, wherein the histogram matching mapping relations map to a plurality of noise level ranges, and the filter value calculator selects the corresponding histogram matching mapping relation according to the noise level range of the noise level.

7. The filter according to claim 6, wherein the histogram matching mapping relations further correspond to a plurality of thresholds, and each threshold corresponding to one histogram matching mapping relation is inversely correlated with the noise level range.

8. The filter according to claim 3, wherein the histogram matching mapping relation comprises a threshold, the histogram matching mapping relation maps the histogram matching value less than the threshold to a constant value as the histogram matching filter reference value, and maps the histogram matching value greater than the threshold to the histogram matching filter reference value that is greater than or equal to the constant value.

9. A filter for a video stream displaying a previous picture and a current picture on a plurality of pixels of a display, the previous picture comprising a plurality of previous picture values, the current picture comprising a plurality of current picture values, with each previous picture value and each current picture value being corresponding to one of the pixels, the filter comprising:
- a motion difference calculator, for accumulating a difference between the previous picture value and the current picture value in a first neighborhood of each pixel to provide a motion difference for each pixel;
- a filter value calculator, coupled to the motion difference calculator, for providing a filter value for each pixel according to each motion difference;
- a blender, coupled to the filter value calculator, for blending each previous picture value and each current picture value to a filtered picture value according to a first weighting positively correlated with the filter value and a second weighting inversely correlated with the filter value for generating a filtered picture,
- wherein the filter value calculator further generates a motion difference adjustment filter reference value for each pixel according to the motion difference corresponding to each pixel, and provides the filter value according to a positive correlation and each motion difference adjustment filter reference value,
- wherein the filter value calculator further generates a motion difference adjustment value for each pixel according to each motion difference, and maps the motion difference adjustment value corresponding to each pixel to the motion difference adjustment filter reference value according to a motion difference adjustment mapping relation, and
- wherein the filter value calculator selects one from a plurality of motion difference adjustment mapping relations according to a noise level, and maps the motion difference adjustment value to the corresponding motion difference adjustment filter reference value according to the selected motion difference adjustment mapping relation; the filter value calculator selects the corresponding motion difference adjustment mapping relation according to a noise level range of the noise level, and a filter range of each motion difference adjustment mapping relation is positively correlated with the noise level range.

10. The filter according to claim 9, wherein the motion difference adjustment mapping relation corresponds to a filter range, the motion difference adjustment value outside the filter range is mapped to a constant value to serve as the corresponding motion difference adjustment filter reference value, and the motion difference adjustment value within the filter range is mapped to the motion difference adjustment filter reference value greater than or equal to the constant value.

11. The filter according to claim 9, wherein the filter value calculator accumulates each motion difference with weighting in a third neighborhood of each pixel to generate a motion difference average, and accumulates a difference between each motion difference and the motion difference average in each third neighborhood to generate a motion difference discrepancy for each pixel; and the filter value calculator generates the motion difference adjustment value for each pixel according to a product of the motion difference discrepancy and a gain.

12. A filter for a video stream displaying a previous picture and a current picture on a plurality of pixels of a display, the previous picture comprising a plurality of previous picture values, the current picture comprising a plurality of current picture values, with each previous picture value and each current picture value being corresponding to one of the pixels, the filter comprising:
- a motion difference calculator, for accumulating a difference between the previous picture value and the current picture value in a first neighborhood of each pixel to provide a motion difference for each pixel;
- a filter value calculator, coupled to the motion difference calculator, for providing a filter value for each pixel according to each motion difference; and
- a blender, coupled to the filter value calculator, for blending each previous picture value and each current picture value to a filtered picture value according to a first weighting positively correlated with the filter value and a second weighting inversely correlated with the filter value for generating a filtered picture,
- wherein the filter value calculator further provides a picture standard deviation and a picture standard deviation filter reference value according to the current picture value corresponding to each pixel, and maps each picture standard deviation of each pixel to each picture standard deviation filter reference value according to a picture standard deviation mapping relation, and provides the filter value according to a positive correlation and the picture standard deviation filter reference value of each pixel, and
- wherein the filter value calculator selects one from a plurality of picture standard deviation mapping relations according to a noise level, and maps the picture standard deviation to the corresponding picture standard deviation filter reference value; each picture standard deviation mapping relation corresponds to a noise level range and a filter range, the filter value calculator selects the corresponding picture deviation mapping relation according to the noise level range of the noise level, and the filter range corresponding to each picture standard deviation mapping relation is positively correlated with the noise level range.

13. The filter according to claim 12, wherein the picture standard deviation mapping relation corresponds to a filter range, the picture standard deviation beyond the filter range is mapped to a constant to serve as the corresponding picture standard deviation filter reference value, and the picture standard deviation within the filter range is mapped to the picture standard deviation filter reference value greater than or equal to the constant.

* * * * *